United States Patent [19]

Hoefer et al.

[11] Patent Number: 4,797,222

[45] Date of Patent: * Jan. 10, 1989

[54] FOAM INHIBITOR MIXTURE

[75] Inventors: Rainer Hoefer, Duesseldorf; Karl H. Schmid, Mettmann; Adolf Asbeck, Duesseldorf; Uwe Held, Velbert, all of Fed. Rep. of Germany

[73] Assignee: Henkel Kommanditgesellschaft auf Aktien, Duesseldorf, Fed. Rep. of Germany

[*] Notice: The portion of the term of this patent subsequent to May 17, 2005 has been disclaimed.

[21] Appl. No.: 39,050

[22] Filed: Apr. 16, 1987

[30] Foreign Application Priority Data

Apr. 18, 1986 [DE] Fed. Rep. of Germany ....... 3613128

[51] Int. Cl.$^4$ .......................... C11D 1/72; B01D 19/04
[52] U.S. Cl. ........................... 252/174.21; 252/174.22; 252/321; 252/358
[58] Field of Search ................... 252/321, 358, 174.21, 252/174.22; 568/624

[56] References Cited

U.S. PATENT DOCUMENTS 4,548,729 10/1985 Schmid et al. ................ 252/174.21
4,745,231 5/1988 Lange et al. ........................ 568/624

Primary Examiner—Paul Lieberman
Assistant Examiner—Christine A. Skane
Attorney, Agent, or Firm—Ernest G. Szoke; Henry E. Millson, Jr.; Real J. Grandmaison

[57] ABSTRACT

A foam inhibitor mixture of compounds corresponding to the following formulae:

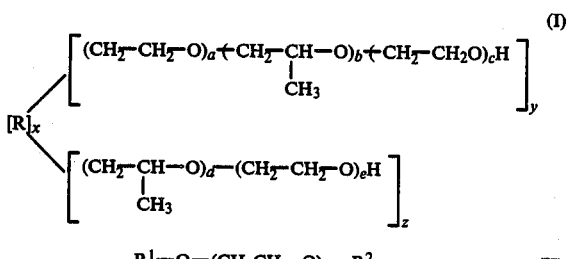

in which R represents a glycerol residue, trimethylol ethane residue, trimethylol propane residue or a polyglycerol residue having a degree of polymerization x of from 2 to 6 and the indices $y=(x-z+2)$, $z=(x-y+2)$, $a=1$ to 15, $b=50$ to 250, $c=1$ to 15, $d=50$ to 250 and $e=1$ to 15, with the proviso that the sums $(a+c+e)=2$ to 20, $(b+d)=50$ to 250 and $(c+e)=1$ to 15 and y has a value of at least 1; $R^1$ represents a straight-chain or branched-chain alkyl or alkenyl radical containing from 8 to 20 C-atoms or an aromatic alkyl radical containing from 12 to 20 C-atoms, $R^2$ represents an alkyl radical containing from 3 to 8 C-atoms and n is a number of from 4 to 30. The mixture preferably contains from 99 to 70% by weight of the block polymer (I) and from 1 to 30% by weight of the emulsifier (II).

10 Claims, No Drawings

FOAM INHIBITOR MIXTURE

BACKGROUND OF THE INVENTION

1. Field of the Invention

This invention relates to compositions useful as foam inhibitors, and more particularly relates to a foam inhibitor mixture of a block polymer and an emulsifier.

2. Statement of Related Art

Copending application U.S. Ser. No. 893,756, filed Aug. 6, 1986, entitled "Alkylene Oxide Block Polymers Usable as Defoamers" discloses block polymers useful as foam inhibitors which have the formula

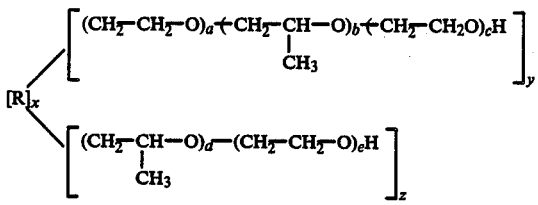

in which R represents a glycerol or polyglycerol residue having a degree of polymerization x of from 1 to 6 and the indices $y=(x-z+2)$, $z=(x-y+2)$, $a=1$ to 15, $b=50$ to 250, $c=1$ to 15, $d=50$ to 250 and $e=1$ to 15, with the proviso that the sums $(a+c+e)=2$ to 20, $(b+d)=50$ to 250 and $(c+e)=1$ to 15 and y has a value of at least 1.

STATEMENT OF THE INVENTION

Other than in the operating examples, or where otherwise indicated, all numbers expressing quantities of ingredients or reaction conditions used herein are to be understood as modified in all instances by the term "about".

It has been found the the foam inhibitors corresponding to formula (I):

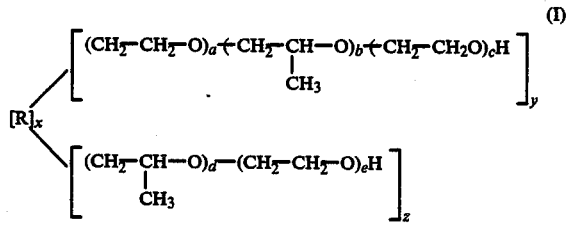

in which R represents a glycerol residue (x=1), a trimethylol ethane residue (x=1) or trimethylol propane residue (x=1) or a polyglycerol residue having a degree of polymerization x of from 2 to 6, and the indices $y=(x-z+2)$, $z=(x-y+2)$, $a=1$ to 15, $b=50$ to 250, $c=1$ to 15, $d=50$ to 250 and $e=1$ to 15, with the proviso that the sums $(a+c+e)=2$ to 20, $(b+d)=50$ to 250 and $(c+e)=1$ to 15 and y has a value of at least 1, are advantageously present in admixture with an emulsifier corresponding to formula (II):

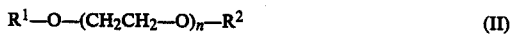

in which $R^1$ is a linear or branched $C_8$-$C_{20}$ alkyl or alkenyl radical or a $C_{12}$-$C_{20}$ alkyl aromatic radical (e.g., phenylalkyl group such as octylphenyl, nonylphenyl, decylphenyl, etc.), $R^2$ is a $C_3$-$C_8$ alkyl radical and n is a number of from 4 to 30. $R^1$ is preferably a linear $C_{10}$-$C_{18}$ alkyl radical, $R^2$ is preferably a $C_4$-$C_6$ alkyl radical and n is a preferably a number of from 6 to 20.

Preferred block polymers of formula I are those in which the indices y=at least 2, a=2 to 10, b=80 to 100, d=80 to 100, c=2 to 10, e=2 to 10, and the sum $(a+c+e)=3$ to 15. Other particularly preferred block polymers are those in which R is a glycerol residue, i.e., in which x=1. In these block polymers derived from glycerol, preferred compounds are those in which y=2 or 3 and z=0 or 1.

The block polymers are prepared by methods known per se which are preferably carried out under pressure and at elevated temperature, for example at 80° to 200° C. and preferably at 100° to 130° C., in the presence of acidic or alkaline catalysts. Acidic catalysts are, for example, LEWIS acids, such as boron trifluoride or aluminum chloride. Preferred catalysts are alkaline catalysts, such as the alcoholates, hydroxides, oxides, carbonates, hydrides or amides of alkali or alkaline-earth metals. Particlarly preferred catalysts are the alcoholates, for example the methylates or ethylates, and the hydroxides of sodium or potassium. The catalysts are generally used in quantities of from 0.05 to 3% by weight and preferably in quantities of from 0.1 to 1% by weight, based on the end product. On completion of the reaction, the catalyst may be inactivated by neutralization and the salt formed mechanically removed. In cases where its presence is not troublesome, the catalyst may even remain in the product which, in general, is entirely safe in view of the small quantities in which the block polymer is used as foam inhibitor.

Suitable starting materials for the production of the block polymers of formula (I) are glycerol, polyglycerol, trimethylol ethane, trimethylol propane and mixtures thereof. The polyglycerols which accumulate, for example as distillation residues, in the commerical production of glycerol and which generally have an average degree of polymerization of from 2 to 6 may be used as the starting material, optionally after admixture with more or less large quantities of monomeric glycerol. However, glycerol is preferably used as starting material. Technical, particularly discolored, starting materials are best treated beforehand with chemical or adsorptive bleaching agents and dehydrated before the reaction, for example by heating in vacuo.

After addition of the catalyst, the starting material is reacted while stirring in a first stage with from 1 to 15 moles and preferably with from 2 to 10 moles of ethylene oxide. After the pressure in the autoclave has fallen, which generally takes from 0.5 to 1.4 hours and indicates the end of the reaction, from 50 to 250 moles and preferably from 80 to 200 moles of propylene oxide are introduced under pressure with continued stirring. On completion of the second stage of the reaction, indicated by a drop in pressure, the reaction with from 1 to 15 moles and preferably with from 2 to 10 moles ethylene oxide takes place correspondingly. The total quantity of ethylene oxide used in the first and third stages amounts to between 2 and 20 moles and preferably to between 3 and 15 moles. Since the quantity of reaction product multiplies from stage to stage, particularly in the second stage, the reaction is best divided up into several stages.

The composition of the block polymers in regard to the ratio of the two indices y and z to one another depends to a certain extent upon the number of the subscript "a" ethylene oxide groups. Ethylene oxide is known to react preferentially with primary hydroxyl groups. Accordingly, most of the primary hydroxyl groups in the polyols used react with ethylene oxide in the first stage, the ethylene glycol ethers formed as intermediates preferentially reacting with ethylene oxide thereafter. The reaction with propylene oxide is accompanied by the formation of secondary hydroxyl groups, so that both the hydroxyl groups of the alkoxylation product being formed and also the hitherto unreacted hydroxyl groups of the starting material may be propoxylated to the same extent shortly after the beginning of the propoxylation stage. It follows from This that small proportions of ethylene oxide lead to comparatively higher values of z in the first stage, for example where a=1 to 3, and that, on the other hand, the value of z decreases with increasing value of a.

The compounds corresponding to formula (II) are known compounds. They are generally produced by ethoxylation of alcohols corresponding to the formula $R^1$—OH and subsequent etherification of the terminal hydroxyl group by conversion into the alcoholate and reaction with alkyl chlorides or alkyl bromides (Williamson synthesis). Suitable starting materials are alcohols obtained from natural fats and mixtures of such alcohols or synthetic alcohols, for example obtained by oxo-synthesis or by the Ziegler process, and mixtures of such alcohols. Examples of such alcohols are decyl, undecyl, lauryl, tridecyl, tetradecyl, pentadecyl, cetyl, stearyl and oleyl alcohol and mixtures thereof. Oxo alcohols can be methyl-branched adjacent the hydroxyl group. Cocosalcohol mixtures and mixtures of oxoalcohols containing from 12 to 15 C-atoms have proven to be particularly suitable. The substituents $R^2$ may consist, for example, of propyl, isopropyl, n-butyl, isobutyl, amyl, isoamyl, hexyl, heptyl or octyl radicals. $C_4$–$C_6$ alkyl radicals are preferred, a $C_4$-alkyl radical being particularly preferred.

The mixture preferably comprises from 99 to 70% by weight, and more especially from 96 to 80% by weight, of the block polymer of formula (I) and from 1 to 30% by weight, and more especially from 4 to 20% by weight, of the emulsifier of formula (II). It has been found that these mixtures form stable, clear aqueous dispersions which make them particularly suitable for many applications. In emulsified form, the foam inhibitors Are even more effective in some cases than in nonemulsified form. This is particularly the case where they are used in aqueous polymer dispersions and latices, for example aqueous dispersions of acrylate or vinyl acetate homopolymers and copolymers, natural rubber and synthetic rubber latices. They are particularly suitable as foam inhibitors in the further processing of polymer dispersions, for example in the removal of monomers from polyvinyl chloride, polystyrene or polybutadiene obtained by emulsion or suspension polymerization. In addition, they effectively prevent foaming during the refilling, transport and application of aqueous systems such as these.

In practice, the mixtures can be used undiluted or diluted with water, for example, in a ratio of mixture to water of from 1:10 to 1:200 and preferably of from 1:25 to 1:100. Emulsions such as these are clear and are stable in storage over an observation period of several weeks.

The mixtures of the invention can also be used after dissolution in organic solvents, for example low molecular weight alcohols. They can also be mixed with diluents, dispersants or other foam-inhibiting compounds and used in that form. Examples of auxiliaries such as these are fatty acid esters and paraffins or paraffin oils. They can also be applied to carrier particles of an absorbent material and used in this form, i.e., as pourable and free-flowing adsorbates. Suitable carrier materials are, for example, loose, more especially spray-dried, salts, such as sulfates, carbonates, phosphates, polyphosphates, silicates and borates of sodium or magnesium, finely divided silicon dioxide (kieselguhr, Aerosil TM) or aluminum oxide and finely divided clays, bentonites and alumosilicates and also mixtures of adsorbents such as these.

The preparations of the invention are highly effective foam inhibitors and are suitable for numerous applications, more especially in the food industry and in chemical process engineering. Examples include the sugar industry (defoaming of molasses), the fermentation industry (defoaming of yeast and enzyme solutions), the starch industry (production of potato starch) and the production of phosphoric acid from mineral phosphates. Further applications include industrial cleaners and cleaning processes, particularly in the spray cleaning and washing of bottles, and the use of the preparations as low-foam wetting agents or rather as foam inhibitors in polymerization reactions.

The particular value of the mixtures of the invention is that they retain their foam-inhibiting effect for long periods. In many technical processes, the treatment solutions are exposed for long periods to severe mechanical stressing and to high temperatures, as for example in evaporation processes with pump-recirculation of the solution. Although there are many known foam inhibitors which bring about spontaneous foam collapse in cases such as these, the effect of such inhibitors soon weakens and foam builds up again. Other products destroy the foam relatively slowly, but retain their foam-inhibiting effect for long periods. The inhibitor mixtures of the invention are distinguished both by a strong spontaneous effect and also by a long-lasting effect. They have the major advantage over numerous silicone- or paraffin-based foam inhibitors in not hydrophobicizing the substrate.

The invention will be illustrated but not limited by the following examples.

EXAMPLES

I. Preparation of the Block Polymers a. 444 g (4.8 moles) of anhydrous glycerol were mixed with 8.9 g of sodium methylate (used as a 30% solution in methanol) and, after removal of the methanol by heating in vacuo in an autoclave, the resulting mixture was reacted while stirring for 2 hours at 180° C. with 1550 g (35.4 moles) of ethylene oxide (EO). After the pressure had fallen, the reaction mixture was stirred for 30 minutes and the product subsequently cooled.

b. 364 g (0.89 mole) of the ethoxylated glycerol (7.3 EO) from step (a) were mixed with 17.6 g KOH (30% solution in methanol) and, after removal of the methanol in vacuo in an autoclave, the resulting mixture was reacted while stirring at 120° C. with 1630 g (28.2 moles) propylene oxide (PO). After the pressure had fallen, the reaction mixture was stirred for 30 minutes at 120° C. The cooled product corresponded to the composition R+7.3 EO+32 PO.

c. After addition of 12.8 g KOH (30% solution in methanol) and removal of the methanol in vacuo in an autoclave, 564 g (0.24 mole) of the reaction product obtained in (b) were reacted while stirring at 120° C. with another 1395 g (24.1 moles) of propylene oxide.

After the pressure had fallen, the reaction mixture was stirred for another 30 minutes at 120° C. 59 g (1.34 moles) of ethylene oxide were then introduced. After the pressure had fallen, the reaction mixture was stirred for another 30 minutes and cooled. A substantially colorless product was obtained, of which the theoretical composition was

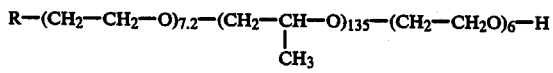

in which R is the glycerol residue.

The analytically determined hydroxyl number (OH no.) was 30. The difference from the theoretical value is explained by the fact that, during the alkoxylation reaction, small amounts of the propylene oxide isomerize to allyl alcohol which then further reacts with more propylene oxide to form the corresponding polypropylene glycol ether. This secondary product does not interfere in the practical application of the products.

II. Preparation of the Emulsifiers

2a. The starting material used for the emulsifier was a $C_{12}$–$C_{18}$ cocosalcohol from which the so-called first-cut alcohols containing 10 C-atoms and less had been separated off and which had been reacted with 7 moles of ethylene oxide (EO). Equimolar quantities of sodium methylate were then added to the polyglycol ether, following by conversion into the alcoholate by distilling off the methyl alcohol. The alcoholate was then reacted with equimolar quantites of 1-n-butyl chloride and the sodium chloride accumulating as a secondary product separated off.

The following emulsifiers were similarly prepared:

2b. Cocosalcohol+12 EO-(n)butyl ether
2c. Oleyl alcohol+16 EO-(n)butyl ether

III. Preparation of the Foam Inhibitor Dispersion 90 g of the block polymer of Example I above were mixed at room temperature with quantities of 10 g of the emulsifiers of Example II above. The homogenized mixtures were clear and stable in storage. Aqueous dispersions containing 2% by weight of the mixed products were also clear and remained stable over an observation period of 4 weeks at 25° C.

IV. Performance Testing

Mixtures of the block polymer of Example I and the emulsifiers of Examples 2a to c were tested. A test solution consisting of 100 ml of an aqueous polybutadiene dispersion was poured at 70° C. into a 1-liter graduated standing cylinder. Air was continuously blown in through a fine-pored glass frit arranged at the bottom of the standing cylinder. After the foam volume had increased to 500 ml, 3 drops of the 2% aqueous foam inhibitor dispersion were applied to the column of foam from a pipette. The addition was repeated after 2 and 3 minutes with continuous injection of air. The results of the foam measurements. carried out at 30 second intervals are shown in Table 1. A (abbreviation for addition) in conjunction with +means addition of 3 drops of the foam inhibitor dispersion.

V. Comparison Tests

The following known emulsifiers were used for comparison:
C1 cocosalcohol+5 EO
C2 cocosalcohol+3 EO
C3 nonylphenol+6.5 EO
C4 oleic acid+8 EO
C5 potassium oleate Mixtures of 9 parts of the block polymer of Example I and 1 part of emulsifier were slightly Clouded in the case of C1 and heavily clouded in all other cases and were not stable in storage after dilution with water (2% by weight). As can be seen from Table 1, their foam inhibiting effect is inadequate or leads to problems through coagulation (index X) or intensified foaming. Accordingly, tests C2 and C5 were terminated after 1 minute and the other tests after 2 minutes.

TABLE 1

| Example No. | Start | A | 0.5 min. | 1 min. | A | 1.5 mins. | 2 mins. | A | 2.5 mins. | 3 mins. |
|---|---|---|---|---|---|---|---|---|---|---|
| I + 2a | 500 | + | 180 | 190 | + | 190 | 190 | + | 130 | 190 |
| I + 2b | 500 | + | 220 | 240 | + | 190 | 210 | + | 200 | 180 |
| I + 2c | 500 | + | 180 | 200 | + | 190 | 190 | + | 190 | 180 |
| I + C1 | 500 | + | 225 | 225 | + | 225 | 300 | | | |
| I + C2 | 500 | + | 175 | (X) | | | | | | |
| I + C3 | 500 | + | 290 | 350 | + | 300 | 420 | | | |
| I + C4 | 500 | + | 300 | 400 | + | 225 | 350 | | | |
| I + C5 | 500 | + | 500 | 500 | | | | | | |

Comparable results are obtained where the block polymer of Example I is replaced by block polymers in which the glycerol residue R is replaced by a trimethylol propane residue or a trimethylol ethane residue and has the following formula:

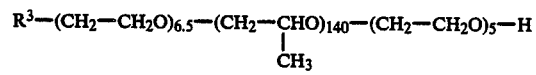

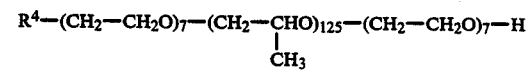

$R^3$ = trimethylol propane residue
$R^4$ = trimethylol ethane residue

We claim:
1. A foam inhibitor mixture comprising:
(a) a foam inhibiting quantity of a block polymer of the formula:

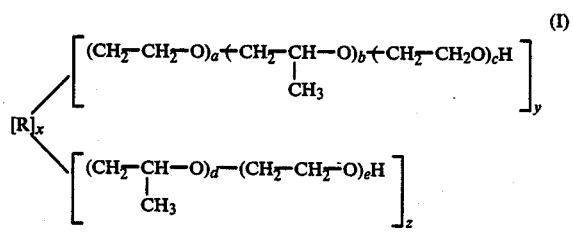

in which R represents a glycerol residue (x=1), a trimethylol ethane residue (x=1) or trimethylol propane residue (x=1) or a polyglycerol residue having a degree of polymerization x of from 2 to 6, and the indices $y=(x-z+2)$, $z=(x-y+2)$, $a=1$ to 15, $b=50$ to 250, $c=1$ to 15, $d=50$ to 250 and $e=1$ to 15, with the proviso that the sums $(a+c+e)=2$ to 20, $(b+d)=50$ to 250 and $(c+e)=1$ to 15 and y has a value of at least 1, and (b) a minor quantity of an emulsifier of the formula:

$$R^1-O-(CH_2CH_2-O)_n-R^2 \qquad (II)$$

in which $R^1$ is a linear or branched $C_8$–$C_{20}$ alkyl or alkenyl radical or a $C_{12}$–$C_{20}$ aromatic alkyl radical, $R^2$ is a $C_3$–$C_8$ alkyl radical and n is a number of from 4 to 30.

2. The mixture of claim 1 wherein in component (a) R represents a glycerol residue $(x=1)$.

3. The mixture of claim 2 wherein in component (b) $R^1$ is a straight chain alkyl or alkenyl radical containing from 10 to 18 carbon atoms, $R^2$ is an alkyl radical containing from 4 to 6 carbon atoms, and n is a number of from 6 to 20.

4. The mixture of claim 1 wherein component (a) is present in from about 99 to about 70% by weight, and component (b) is present in from about 1 to about 30% by weight, based on the total quantity of components (a) and (b) present in the mixture.

5. The mixture of claim 4 wherein component (a) is present in from about 96 to about 80% by weight, and component (b) is present in from about 4 to about 20% by weight.

6. The mixture of claim 1 wherein in component (a), y=at least 2, a=2 to 10, b=80 to 100, d=80 to 100, c=2 to 10, e=2 to 10, and the sum $(a+c+e)=3$ to 15.

7. The mixture of claim 2 wherein in component (a) y=2 or 3 and z=0 or 1.

8. A foam inhibitor mixture comprising:
(a) from about 96 to about 80% by weight of a block polymer of the formula:

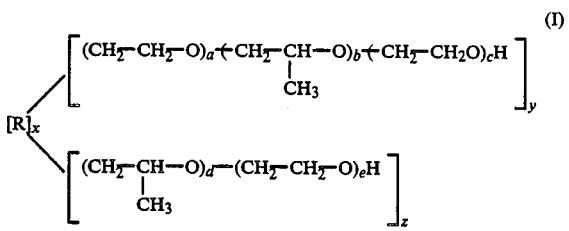

in which R represents a glycerol residue $(x=1)$, y=2 or 3, z=0 or 1, a=2 to 10, b=80 to 100, d=80 to 100, c=2 to 10, e=2 to 10, and the sum $(a+c+e)=3$ to 15; and (b) from about 4 to about 20% by weight of an emulsifier of the formula:

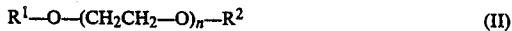

$$R^1-O-(CH_2CH_2-O)_n-R^2 \qquad (II)$$

in which $R^1$ is a linear or branched $C_{10}$–$C_{18}$ alkyl radical, $R^2$ is a $C_4$–$C_6$ alkyl radical, and n is a number of from 6 to 20, wherein the above percentages by weight are based on the total quantity of components (a) and (b) present in the mixture.

9. A method of reducing foam in a system where foaming is a problem comprising adding thereto a foam inhibiting quantity of the mixture of claim 1.

10. A method of reducing foam in a system where foaming is a problem comprising adding thereto a foam inhibiting quantity of the mixture of claim 8.

* * * * *